United States Patent
Piccin

(10) Patent No.: US 12,344,172 B1
(45) Date of Patent: Jul. 1, 2025

(54) VEHICLE INTERIOR PANEL WITH SHAPE-CHANGING SURFACE

(71) Applicant: Faurecia Interior Systems, Inc., Auburn Hills, MI (US)

(72) Inventor: Hugo Piccin, Cupertino, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 18/615,369

(22) Filed: Mar. 25, 2024

(51) Int. Cl.
  *B60R 13/02* (2006.01)
  *B60Q 3/20* (2017.01)

(52) U.S. Cl.
  CPC ............ *B60R 13/0275* (2013.01); *B60Q 3/20* (2017.02); *B60R 2013/0287* (2013.01)

(58) Field of Classification Search
  CPC .............................. B60R 13/0275; B60Q 3/20
  See application file for complete search history.

(56) References Cited

U.S. PATENT DOCUMENTS

| | | | | |
|---|---|---|---|---|
| 5,713,655 | A * | 2/1998 | Blackman | F21S 9/022 362/85 |
| 7,651,145 | B2 | 1/2010 | Prokop et al. | |
| 10,733,906 | B2 * | 8/2020 | Pascall | H01F 7/081 |
| 10,795,519 | B2 | 10/2020 | Salandre et al. | |
| 2017/0076885 | A1 * | 3/2017 | Stryker | G06F 3/0393 |
| 2020/0249779 | A1 * | 8/2020 | Salandre | G06F 3/044 |

FOREIGN PATENT DOCUMENTS

| | | |
|---|---|---|
| EP | 1871965 B1 | 11/2011 |
| EP | 4160360 A1 | 4/2023 |
| EP | 3737579 B1 | 6/2023 |
| EP | 4077049 B1 | 9/2023 |

\* cited by examiner

*Primary Examiner* — Thomas M Sember
(74) *Attorney, Agent, or Firm* — Reising Ethington P.C.

(57) ABSTRACT

A vehicle interior panel includes an electromagnet configured to add a localized recess to a base contour of the panel when activated. The recess can provide a visual and tactile feature along the outer surface of the panel to allow a user to interact with the panel. The panel may be touch sensitive and/or include a proximity sensor that triggers formation of the recess.

20 Claims, 1 Drawing Sheet

VEHICLE INTERIOR PANEL WITH SHAPE-CHANGING SURFACE

TECHNICAL FIELD

The present disclosure is related generally to vehicle interior panels and, more particularly, to such panels having a shape-changing surface.

BACKGROUND

Vehicle interior panels often include switches, buttons, dials, or similar elements for a vehicle occupant to use to interact with one or more vehicle systems, such as an audio system, HVAC system, storage compartment, etc. This is often to the dismay of vehicle interior designers who would sometimes rather not have to incorporate such utilitarian features as part of the aesthetic of the vehicle interior.

Co-owned U.S. Pat. No. 7,651,145 to Prokop, et al. addresses this problem with a mechanical switch hidden beneath the surface of the panel. A user can press the mechanical switch by pressing on an overlying material layer. The disclosed switch activates a relay to operate a storage compartment latch, which can be located away from the switch—i.e., the driver can open the glove box without leaning over to the passenger side of the vehicle to do so. The only indication of the location of the hidden switch is a marking on the panel surface, which is prone to wear and cannot be seen or felt in the dark.

SUMMARY

An embodiment of a vehicle interior panel includes an outer surface having a base contour, and the panel is configured to add a localized recess to the base contour when an electromagnet underlying the outer surface is activated.

Another embodiment of the vehicle interior panel includes the features of the previously listed embodiment, wherein the panel includes the electromagnet and further comprises: a substrate supporting the electromagnet, a decorative layer disposed over the substrate and providing said outer surface, and an elastic layer between the substrate and the decorative layer, wherein the elastic layer biases the localized recess toward the base contour.

Another embodiment of the vehicle interior panel includes the features of the previously listed embodiment and further comprises an actuation pad affixed to an inner surface of the decorative layer, the actuation pad being attracted to the electromagnet when the electromagnet is activated.

Another embodiment of the vehicle interior panel includes the features of either of the two previously listed embodiments, and the elastic layer is a spacer fabric.

Another embodiment of the vehicle interior panel includes the features of any of the three previously listed embodiments, and the elastic layer has a compression set less than 10%.

Another embodiment of the vehicle interior panel includes the features of any previously listed embodiment and further comprises a conductive layer configured as a touch sensor to detect a user touching the localized recess, a signal from the touch sensor being received by a controller to control an aspect of a vehicle system.

Another embodiment of the vehicle interior panel includes the features of any of the previously listed embodiments, and the panel is configured to add the localized recess to the base contour when the electromagnet is activated with a first polarity and configured to add a localized protrusion to the base contour when the electromagnet is activated with an opposite second polarity.

Another embodiment of the vehicle interior panel includes the features of any previously listed embodiment, and the electromagnet is activated in response to a sensor detecting the presence of a user at the panel.

Another embodiment of the vehicle interior panel includes the features of any previously listed embodiment and further comprises a light source underlying the outer surface that shines light through the outer surface when the electromagnet is activated.

Another embodiment of the vehicle interior panel includes the features of any previously listed embodiment, wherein the panel includes the electromagnet and further comprises: a decorative layer providing said outer surface, and an actuation pad affixed to an inner surface of the decorative layer, the actuation pad being attracted to the electromagnet when the electromagnet is energized, wherein the light from the light source shines through an opening in the pad and through a translucent portion of the decorative layer.

Another embodiment of the vehicle interior panel includes the features of any previously listed embodiment, and a boundary of the recess is round and has a diameter in a range from 5 mm to 15 mm.

Another embodiment of the vehicle interior panel includes the features of any previously listed embodiment, and the recess has a depth in a range from 0.1 mm to 2 mm.

Another embodiment of the vehicle interior panel includes the features of any previously listed embodiment, and the recess is configured to detect a touch by a user.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel capable of changing the contour of its outer surface to include a localized recess or a localized protrusion. The outer surface may appear to be that of a plain panel with no apparent switches, buttons, or other control interface with the localized feature appearing under pre-determined conditions to reveal that the panel surface is actually a control surface of a human-machine interface. To the user, an operable button to interface with one or more vehicle systems or components seems to appear out of nowhere, providing a modern or futuristic effect while also providing smooth, uninterrupted vehicle interior surfaces when the button is not needed. The addition of a localized recess or protrusion to a base contour of the panel can provide a visual and tactile feature along a surface of the panel to more easily allow a user to interact with the panel.

Figure 1:
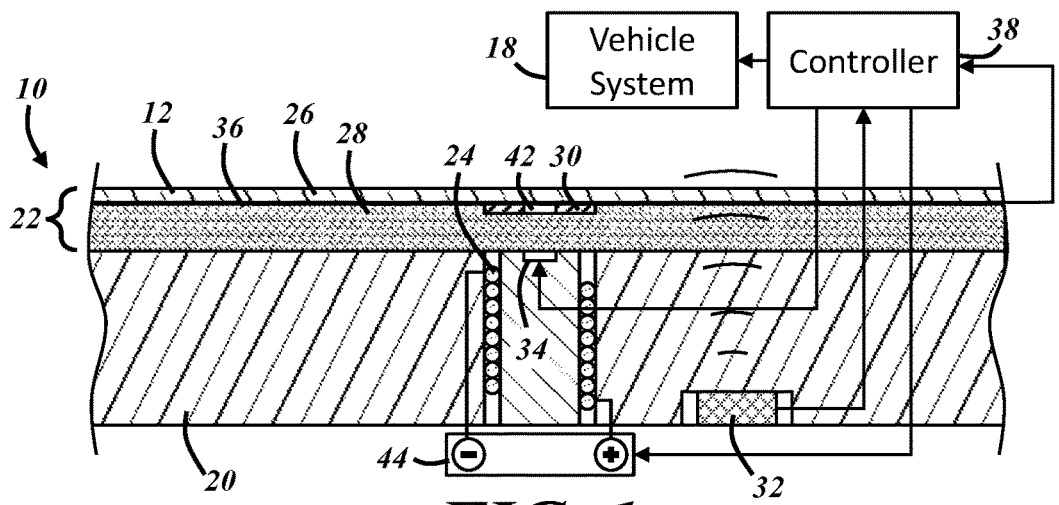
FIG. 1 is a cross-sectional view of an embodiment of a vehicle interior panel with a base contour.
Figure 2:
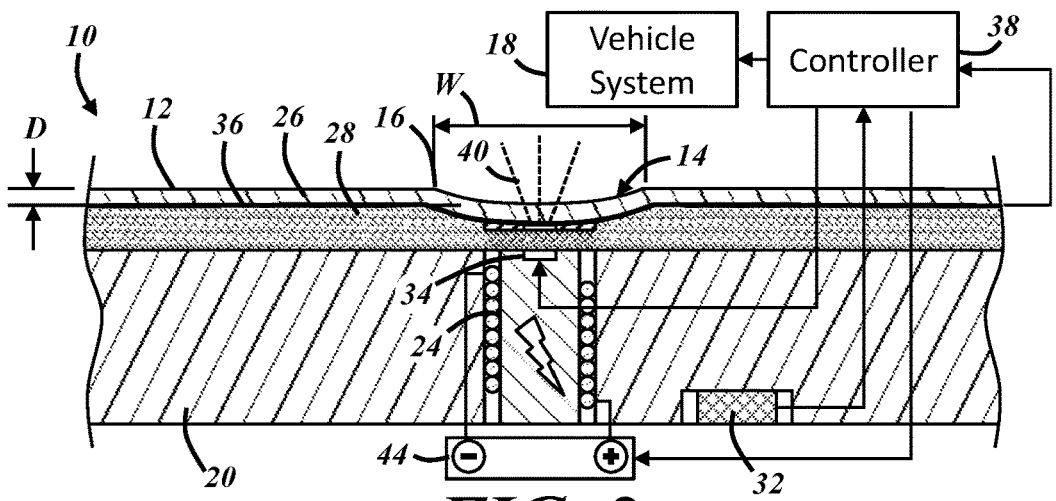
FIG. 2 is the cross-sectional view of FIG. 1 with an electromagnet adding a localized recess to the base contour.

FIG. 1 is a cross-sectional view of a portion of such a panel 10 with an outer surface 12 having a base contour, and FIG. 2 illustrates the same vehicle interior panel 10 with a localized recess 14 added to the base contour. The base contour is the equilibrium or at-rest contour of the outer surface 12. In this example, the base contour is flat, but it can be any generally smooth, continuous surface. When the recess 14 is added to the base contour as in FIG. 2, the outer surface 12 is no longer at its equilibrium contour. Specifically, the portion of the outer surface 12 outside a boundary 16 of the recess 14 is at its equilibrium contour in FIGS. 1 and 2, but the portion of the outer surface within the boundary of the recess is not. Alternatively, the base contour may be referred to as a first contour, and a different second contour includes the localized recess 14.

The illustrated panel 10 is a control panel that allows a user to interact with the panel to operate or control one or more systems 18 of the vehicle in which it is installed. The boundary 16 of the recess 14 may define a control area that is non-visible to the user when the outer surface 12 is at its base contour as in FIG. 1. The panel 10 includes a substrate 20, a decorative covering 22 disposed over the substrate, and an actuator 24 extending between the substrate and the covering 22. The substrate 20 may be formed from an injected molded plastic or other suitably rigid material. The decorative covering 22 includes a decorative skin layer 26 providing the outer surface 12 of the panel and an elastic layer 28 between the substrate 20 and the skin layer. The skin layer 26 may be a thin (e.g., 0.5 mm to 1.0 mm) polymer-based material (e.g., TPO or TPE) or any other sufficiently elastic material that provides a desired aesthetic look and feel to the panel 10. The elastic layer 28 may be a 3D spacer fabric or an elastic foam layer and may be from 1.5 mm to 10 mm thick, or from 3 mm to 8 mm thick.

A 3D spacer fabric includes a pair of thin, spaced-apart surface layers interconnected by a spacer or mesh layer of pile threads extending therebetween. The spacer layer may be knitted from polymeric threads (e.g., polyester) having a diameter in a range from 0.1 to 0.3 mm. The spacer fabric can be engineered to provide a desired elasticity profile via the material type, size, and angles of inclination of the pile threads. One suitable 3D spacer fabric has a compression set less than 10%, and preferably less than 5%. Compression set is determined based on ASTM D3574-17 and is expressed as:

$$C_t = \left[\frac{t_o - t_f}{t_o}\right] \times 100,$$

where $C_t$ is compression set, $t_o$ is the original thickness of the test specimen, and $t_f$ is the final thickness of the test specimen after being subjected to the test conditions. The test conditions include compressing the test specimen between parallel plates to 50% of its original thickness at 60° C. for 10 seconds, and then removing the compressive force and allowing the test specimen to rest unloaded. After resting unloaded for 60 seconds the final thickness $t_f$ is measured.

The actuator 24 in this example is an electromagnet that generates a polarized magnetic field only when energized. When not energized, the electromagnet 24 does not generate a magnetic field. The actuator 24 is in a fixed position relative to the substrate 20. In the illustrated example, an axis of the electromagnet 24 is perpendicular with the outer surface 12 of the panel and is housed within an opening in the substrate 20. Other arrangements are possible.

The panel 10 also includes an actuation pad 30 affixed to the inner surface of the skin layer 26. The actuation pad 30 is made from a material that is attracted and/or repelled from the electromagnet 24 when the electromagnet is energized. The actuation pad 30 may for example be a magnet or a ferromagnetic material affixed to the skin layer via an adhesive or other suitable means. In some embodiments, the actuation pad 30 is formed by printing a suitable metal or metallic ink on the inner surface of the skin layer 26.

The panel 10 is configured to add the localized recess 14 to the base contour when the electromagnet 24 underlying the outer surface 12 is activated. Specifically, when the electromagnet 24 is activated, the resulting magnetic field attracts the actuation pad 30. In response, the actuation pad 30, together with a localized portion of the skin layer 26, moves toward the electromagnet 24 to form the recess 14 of FIG. 2. This movement compresses a localized portion of the elastic layer 28 between the electromagnet 24 and the actuation pad 30 such that the elastic layer biases the localized recess 14 toward the base contour of the outer surface 12. Accordingly, when the electromagnet 24 is deactivated, the compressed portion of the elastic layer 28 acts to restore the outer surface 12 to its base contour as in FIG. 1.

The localized recess 14 formed when the electromagnet 28 is activated may have a diameter or width W in a range from 5 mm to 15 mm or, preferably, in a range from 5 mm to 10 mm. The localized recess 14 may have a depth D in a range from 0.1 mm to 2.0 mm or, preferably, in a range from 0.5 mm to 1.0 mm. The shape of the actuation pad 30 may at least partly define the shape of the boundary 16 of the recess 14. In the illustrated embodiment, the actuation pad 30 is round or circular such that the boundary 16 of the recess 14 is also round or circular.

Additional features of the illustrated panel 10 include a sensor 32, a light source 34, and a touch sensitive layer 36. In some embodiments, the electromagnet 24 is activated in response to the sensor 32 detecting the presence of a user at the panel 10. The sensor 32 may be configured to detect an object, such as the user's hand, as it approaches the outer surface 12 of the panel 10. The illustrated sensor 32 is a proximity sensor and may operate on any known proximity principle (e.g., ultrasonic). The sensor 32 may be configured to be actively detecting while the outer surface 12 of the panel 10 is at its base contour. The sensor 32 is located adjacent the actuator 24 such that, when a user's hand approaches a location along the outer surface 12 beneath which the electromagnet 24 is positioned, a signal is generated by the sensor. The electromagnet 24 is activated in response to the sensor signal. In the illustrated example, the sensor 32 is in communication with a controller 38, which receives the sensor signal and, in response, activates the electromagnet 24 to form the localized recess 14. The controller 38 may be configured to ignore sensor signals while the electromagnet 24 is activated and/or the controller may be configured to deactivate the electromagnet 24 when the user's hand is no longer detected by the sensor 32. In other embodiments, the controller 38 is omitted, and the sensor 32 simply acts as a switch that activates the electromagnet 24 when a user's hand is detected and deactivates the electromagnet when no hand is detected.

The illustrated light source 34 is configured to emit light 40 and shine the emitted light through the outer surface 12 of the panel when the electromagnet 24 is activated. The light source 34 may include an LED located at or attached to an end of the electromagnet 24, as shown in the figures. In this example, the light source 34 is coaxial with the electromagnet 24 and the actuation pad 30. In this embodiment, the actuation pad 30 is ring-shaped and has an opening 42 formed through it to permit the light 40 from the light source 34 to pass through to the decorative skin layer 26. The skin layer 26 may be formed from a translucent and/or tinted material, at least at the location of the light source 34, such that the actuation pad 30 and light source 34 are not visible to a user from the outer surface 12.

In other examples, the light source 34 is not affixed to the electromagnet and is instead affixed to the decorative covering 22, such as at one of the opposite surfaces of the elastic layer 28, within the elastic layer, or along the inner surface of the decorative skin layer 26. The light source 34 may be located within the opening 42 of the actuation pad 30, for example. The light source 34 may share a power source 44 with the electromagnet 24 such that both are activated when the controller 38 connects the power source to one or the other.

The touch sensitive layer 36 is configured to detect a user touching or pressing the outer surface 12 of the panel 10 at the localized recess 14. In this example, the touch sensitive layer 36 is located along the inner surface of the decorative skin layer 26 of the decorative covering 22. This layer 36 may be a conductive layer, for example, in communication with the controller 38, and the controller may be configured to detect a change in an electrical property of the conductive layer 36. A user pressing on the outer surface 12 may cause a detectable change in resistance of the layer 36, or the presence of a user's finger may cause a detectable change in current distribution along the layer 36. Whether the user is touching or pressing the outer surface 12 at the localized recess 14 may be determined by known methods, including monitoring the electrical properties at specific locations relative to the recess 14. The touch sensitive layer 36 may be configured in accordance with any known touch sensitive principle of operation.

The controller 38 may be configured to control an aspect of a vehicle system 18 when a user's touch is detected at the localized recess 14. In a simple example, the controlled vehicle system 18 is a vehicle ignition system or vehicle power-on system. When the user enters the vehicle with the outer surface 12 at the base contour, the controller 38 begins a detection routine via the sensor 32 for detecting the approach of the user's hand. The user, who knows the general location of the hidden ignition or power-on button along the panel 10, brings their hand near the panel in the vicinity of that location. When the sensor 32 detects the user's hand near the panel 10 and near the location of the hidden button, the controller 38 activates the actuator 24, and the localized recess 14 is added to the base contour. When so-equipped, the light source 34 is also activated to emit and shine light through the outer surface 12 at the recess 14. The controller 38 then begins a second detection routine for detecting when the user presses or touches the localized recess 14. Upon detection of this press or touch, via the touch sensitive layer 36, the controller 38 activates the vehicle system 18 to turn the vehicle on. Once the hidden power button has been revealed and then operated by the user, the controller 38 may deactivate the actuator 24 and/or the light source 34 and await some indication that the user is ready to power the vehicle off before revealing the hidden button again.

This is of course only one illustrative use for the panel 10, and not all of the illustrated and described components are necessary. Staying with the ignition switch example, the localized recess 14 may be added to the base contour when a user enters the vehicle—i.e., the controller 38 may receive a signal from some other vehicle component or system such that the sensor 32 is unnecessary. After the user powers the vehicle on and the recess 14 is removed from the base contour, the controller 38 may be configured to form the recess again based on some indication that the vehicle has been parked, for example. In another example, the touch sensitive layer 36 is used both to detect the user touching or pressing the outer surface 12 at its base contour and to then detect the user touching or pressing the localized recess 14.

Figure 3:
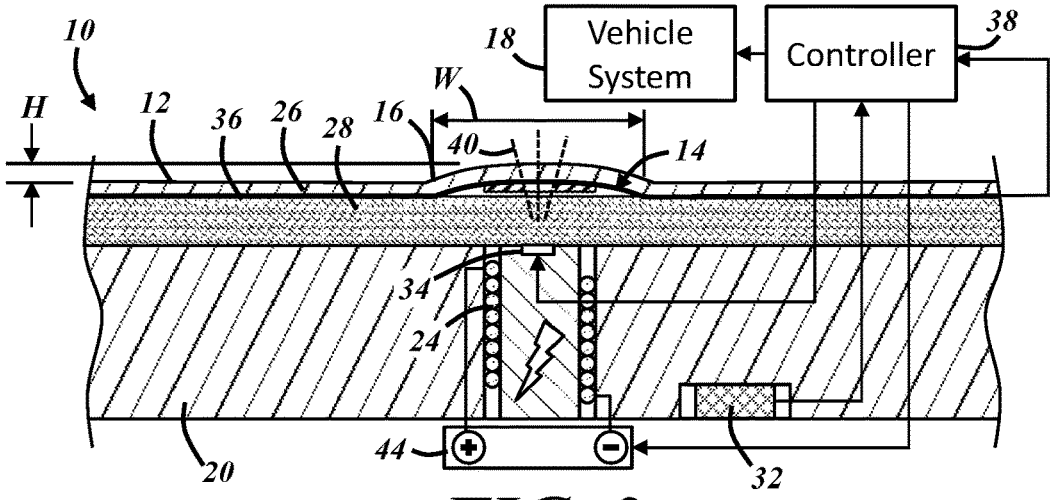
FIG. 3 is the cross-sectional view of FIG. 1 with the electromagnet adding a localized protrusion to the base contour.

In some embodiments, the actuation pad 30 is magnetically polarized such that, when the electromagnet 24 is activated with a first polarity, the localized recess 14 is added to the base contour as in FIG. 2 and, when the electromagnet is activated with an opposite second polarity, a localized protrusion 14' is added to the base contour as in FIG. 3. For example, the actuation pad 30 may have a north pole facing toward the electromagnet 24 and a south pole facing toward the decorative skin 26. When the electromagnet 24 is activated with the first polarity, its south pole is facing toward the actuation pad 30 such that the localized recess 14 is formed. When the electromagnet 24 is activated with the second polarity, its north pole is facing toward the actuation pad 30 such that the actuation pad is repelled from the electromagnet 24 and the localized protrusion 14' is formed. When the panel 10 is configured with this functionality, the actuation pad 30 is affixed to the inner surface of the decorative skin layer 26 and is not attached to the elastic layer 28 such that the actuation pad is free to move away from the elastic layer as shown in FIG. 3.

The other functionalities related to the sensor 32, light source 34, touch sensitive layer 36, and controller 38 remain the same as those discussed above in conjunction with FIGS. 1 and 2. The localized protrusion 14' may have the same shape and width W at its boundary 16' as the localized recess 14, and a height H of the localized protrusion 14' may be the same or in the same ranges as the depth of the localized recess 14.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

Other terms are to be construed using their broadest reasonable meaning unless they are used in a context that requires a different interpretation.

The invention claimed is:

1. A vehicle interior panel, comprising:
   a substrate supporting an electromagnet;
   a decorative layer disposed over the substrate and overlying the electromagnet, the decorative layer having an outer surface with a base contour; and
   an elastic layer between the substrate and the decorative layer with one face of the elastic layer in contact with the substrate and an opposite face of the elastic layer in contact with the decorative layer,
   wherein the panel is configured to add a localized recess to the base contour when the electromagnet is activated, and
   wherein the elastic layer biases the localized recess toward the base contour.

2. The vehicle interior panel of claim 1, further comprising an actuation pad affixed to an inner surface of the decorative layer, the actuation pad being attracted to the electromagnet when the electromagnet is activated.

3. The vehicle interior panel of claim 2, wherein the actuation pad is a ferromagnetic material.

4. The vehicle interior panel of claim 1, wherein the elastic layer is a spacer fabric.

5. The vehicle interior panel of claim 1, wherein the elastic layer has a compression set less than 10%.

6. The vehicle interior panel of claim 1, further comprising a conductive layer configured as a touch sensor to detect a user touching the localized recess, a signal from the touch sensor being received by a controller to control an aspect of a vehicle system.

7. The vehicle interior panel of claim 1, wherein the panel is configured to add the localized recess to the base contour when the electromagnet is activated with a first polarity and configured to add a localized protrusion to the base contour when the electromagnet is activated with an opposite second polarity.

8. The vehicle interior panel of claim 1, wherein the electromagnet is activated in response to a sensor detecting the presence of a user at the panel.

9. The vehicle interior panel of claim 1, further comprising a light source underlying the outer surface that shines light through the outer surface when the electromagnet is activated.

10. The vehicle interior panel of claim 9, further comprising an actuation pad affixed to an inner surface of the decorative layer, the actuation pad being attracted to the electromagnet when the electromagnet is energized, wherein the light from the light source shines through an opening in the actuation pad and through a translucent portion of the decorative layer.

11. The vehicle interior panel of claim 1, wherein a boundary of the recess is round and has a diameter in a range from 5 mm to 15 mm.

12. The vehicle interior panel of claim 1, wherein the recess has a depth in a range from 0.1 mm to 2 mm.

13. The vehicle interior panel of claim 1, wherein the recess is configured to detect a touch by a user.

14. The vehicle interior panel of claim 1, wherein a localized portion of the elastic layer is compressed between the electromagnet and the decorative layer at the localized recess such that, when the electromagnet is deactivated, the compressed localized portion of the elastic layer acts to restore the outer surface to the base contour.

15. The vehicle interior panel of claim 1, further comprising a proximity sensor underlying the outer surface, wherein the localized recess is added to the outer surface when the proximity sensor detects an object approaching a location along the outer surface beneath which the electromagnet is positioned while the outer surface has the base contour.

16. The vehicle interior panel of claim 15, further comprising a touch sensor configured to detect a user touching the localized recess while the electromagnet is activated, a signal from the touch sensor being received by a controller to control an aspect of a vehicle system.

17. The vehicle interior panel of claim 1, wherein the panel is a control panel allowing a user to interact with the panel to control one or more systems of a vehicle in which the panel is installed, the panel being configured to add the localized recess as a control panel button at a non-visible control area of the outer surface when a hand of the user approaches the control area.

18. The vehicle interior panel of claim 17, wherein the localized recess is removed and the outer surface is returned to the base contour when the user touches the control panel button.

19. A vehicle interior panel having an outer surface with a base contour, wherein the panel is configured to add a localized recess to the base contour when a proximity sensor underlying the outer surface detects an object approaching a location along the outer surface beneath which an actuator is positioned while the outer surface has the base contour.

20. The vehicle interior panel of claim 19 including the proximity sensor and actuator, the panel further comprising:
    a substrate supporting the actuator;
    a decorative layer disposed over the substrate and actuator, the decorative providing the outer surface;
    an elastic layer between the substrate and the decorative layer with one face of the elastic layer in contact with the substrate and an opposite face of the elastic layer in contact with the decorative layer;
    an actuation pad attached to the decorative layer and overlying the actuator such that, when the actuator is activated, the actuation pad is attracted to the actuator and the localized recess is added to the base contour, wherein the elastic layer is compressed between the actuator and the actuation pad when the localized recess is added and biases the localized recess toward the base contour; and
    a touch sensor configured to detect a user touching the outer surface at the localized recess while the actuator is activated, a signal from the touch sensor being received by a controller to control an aspect of a vehicle system.

* * * * *